(12) United States Patent
Guo et al.

(10) Patent No.: US 8,280,426 B2
(45) Date of Patent: Oct. 2, 2012

(54) ADAPTIVE POWER BALANCING AND PHASE ADJUSTMENT FOR MIMO-BEAMFORMED COMMUNICATION SYSTEMS

(75) Inventors: Li Guo, Allen, TX (US); Genyuan Wang, Plano, TX (US); Hanqing Lou, Garland, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 12/608,285

(22) Filed: Oct. 29, 2009

(65) Prior Publication Data

US 2011/0105172 A1    May 5, 2011

(51) Int. Cl.
  *H04B 7/005* (2006.01)
(52) U.S. Cl. ..................... 455/522; 455/562.1
(58) Field of Classification Search .......... 455/63.1, 455/63.4, 101, 550.1, 561, 562.1, 277.1, 455/277.2, 69, 522; 375/267, 347
See application file for complete search history.

(56) References Cited

U.S. PATENT DOCUMENTS

| 6,615,024 | B1 | 9/2003 | Boros et al. |
| 6,980,527 | B1 | 12/2005 | Liu et al. |
| 2005/0059348 | A1* | 3/2005 | Chae et al. ........... 455/562.1 |
| 2006/0030366 | A1* | 2/2006 | Park et al. ............ 455/562.1 |
| 2008/0238775 | A1 | 10/2008 | Guo et al. |
| 2008/0242233 | A1* | 10/2008 | Akita et al. ............. 455/101 |

OTHER PUBLICATIONS

Runhua Chen et al., "Multiuser space-time block coded MIMO system with downlink precoding," Communications, 2004 IEEE International Conference in Paris, France, Jun. 20-24, 2004, Piscataway, NJ, USA, IEEE, vol. 5, Jun. 20, 2004, pp. 2689-2693.

* cited by examiner

*Primary Examiner* — Thanh Le
(74) *Attorney, Agent, or Firm* — Edell, Shapiro & Finnan, LLC

(57) ABSTRACT

Techniques are provided for improving performance of a multiple-input multiple-output (MIMO) wireless communication system. At a first wireless communication device (e.g., a base station) having a plurality of antennas, uplink transmissions are received from a second wireless communication device (e.g., a client device). The base station determines a measure of multipath conditions between it and the second wireless communication device based on the received uplink transmissions. The base station applies downlink beamforming weight vectors together with power balance and phase adjustment factors depending on the measure of multipath conditions to transmit multiple downlink data streams across the plurality of antennas simultaneously to the second wireless communication device.

22 Claims, 6 Drawing Sheets

More than one dominant path-Base station does not apply power balance and phase adjustment to downlink data streams Only one dominant path-Base station does apply power balance and phase adjustment to downlink data streams

ADAPTIVE POWER BALANCING AND PHASE ADJUSTMENT FOR MIMO-BEAMFORMED COMMUNICATION SYSTEMS

TECHNICAL FIELD

The present disclosure relates to wireless communication devices and systems and more particularly to multiple-input multiple-output (MIMO) wireless communication systems.

BACKGROUND

In wireless communication networks, a common architecture is to provide a wireless base station device that serves as a gateway for wireless communications with each of multiple wireless client devices, also called mobile stations. The base station may, for example, serve as a gateway to one or more wired networks. An example of such a network is one that involves wireless devices configured to comply with the communication standard of IEEE 802.16, known commercially as WiMAX™.

One way to increase throughput between the two devices, such as from the base station to the client device, is for the base station to employ multiple-input multiple-output (MIMO) communication techniques whereby multiple signal streams are simultaneously transmitted via the plurality of antennas to a give wireless client device. Furthermore, the base station may apply beamforming weight vectors to the signal streams so as to weight them across its plurality of antennas to improve the receive signal-to-noise ratio at the client device.

In order to compute proper beamforming weight vectors, the base station needs to obtain knowledge about the wireless channel. One way the base station can gain knowledge about the channel is when it receives signals from the client device. However, in some wireless communication systems, the client devices are configured to receive signals at multiple antennas but to transmit signals only through a single antenna. As a result, a transmission sent from a single antenna of the client device to the base station does not always provide reliable information about the channel to the base station.

DESCRIPTION OF EXAMPLE EMBODIMENTS

Overview

Techniques are provided herein for improving multiple-input multiple-output (MIMO) wireless communications. At a first wireless communication device (e.g., a base station) having a plurality of antennas, uplink transmissions are received from a second wireless communication device (e.g., a client device). The base station determines a measure of multipath conditions between it and the second wireless communication device based on the received uplink transmissions. The base station applies multiple downlink beamforming weight vectors together with power balance and phase adjustment factors depending on the measure of multipath conditions to transmit multiple downlink data streams across the plurality of antennas simultaneously to the second wireless communication device.

EXAMPLE EMBODIMENTS

Figure 1:
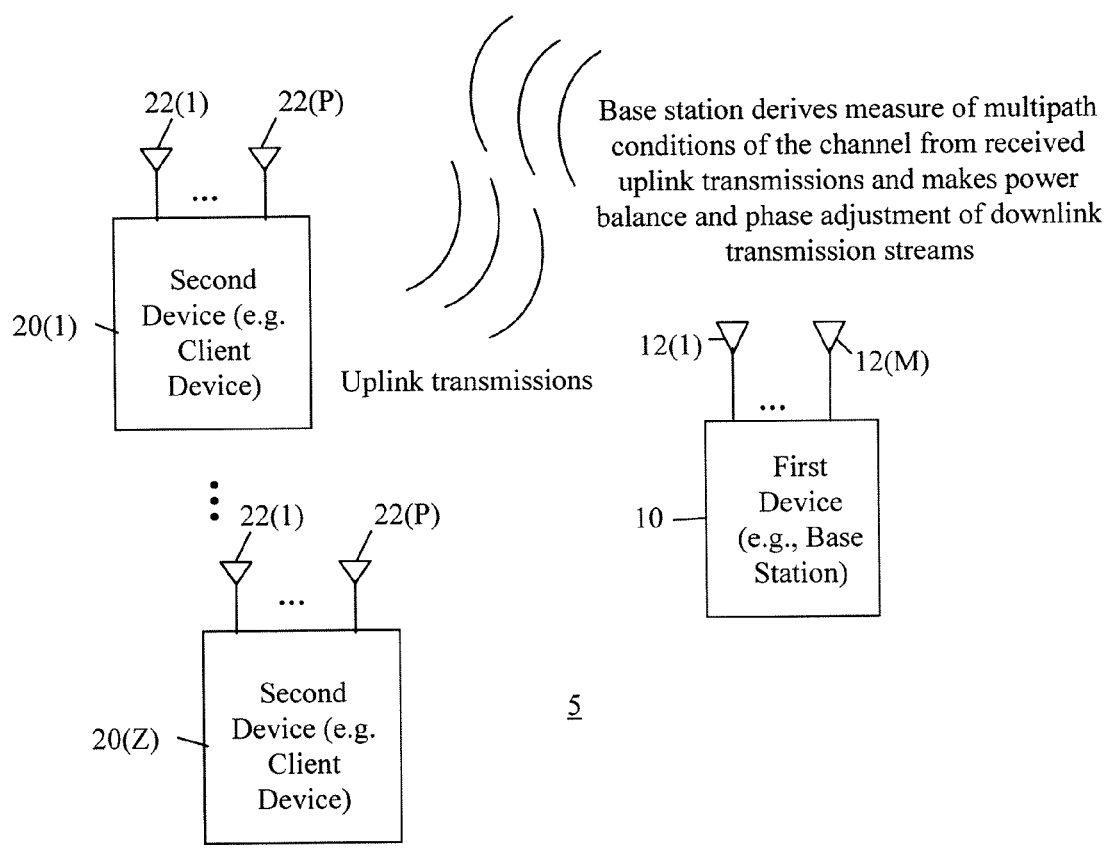
FIG. 1 is block diagram of a wireless communication network in which a base station device is configured to perform adaptive power balance and phase adjustment with respect to multiple downlink data streams to be sent to a wireless client device.

Referring first to FIG. 1, a wireless communication network is shown at reference numeral 5. A wireless base station 10 comprising a plurality of antennas 12(1)-12(M) is provided to serve wireless communications with a plurality of wireless communication client devices 20(1)-20(Z). Each wireless client device 20(1)-20(Z) comprises at least one antenna, but in general it may comprise a plurality of antennas 22(1)-22(P). The base station 10 may be referred to herein as a first wireless communication device and the wireless client devices 20(1)-20(Z) as second wireless communication devices.

The base station 10 is configured to wirelessly communicate with the client devices 20(1)-20(Z) according to any of a variety of wireless communication standards, examples of which are the IEEE 802.16 standard known commercially as WiMAX™ and the IEEE 802.11 standard known commercially as WiFi™. Furthermore, the base station 10 is configured to send downlink transmissions to a given client device using MIMO communication techniques whereby multiple signal streams are sent simultaneously via the plurality of antennas 12(1)-12(M) of the base station 10 to a given client device. MIMO communication techniques are useful to increase the throughput of the channel to a given client device. In addition, the base station can apply beamforming weight vectors to the individual signal streams so as to weight each data stream across the plurality of antennas 12(1)-12(M) to beamform the MIMO streams to a given client device.

Beamforming with one beamforming weight vector can be modeled as a conversion of multiple transmitters at the base station into a single virtual transmitter such that the transmitted signals are best combined from signals received at multiple antennas of the client device so as to enhance the overall receive signal strength at the client device. Combining beamforming and MIMO provides multifold gains: enhanced signal strength from beamforming and increased throughput from MIMO. Moreover, beamforming provides a greater opportunity to improved MIMO channel conditions if appropriate beamforming weight vectors are used.

When generating multiple beamforming signals to be transmitted to a client device, the base station 10 needs to use multiple beamforming weight vectors that are tailored to the current wireless channel conditions between the base station 10 and the particular wireless client device to which the base station 10 is transmitting. One way to derive knowledge about the wireless channel at the base station 10 with respect to a client device is to analyze uplink transmissions sent by the client device to the base station. In some communication systems, such as a WiMAX system, however, a client device is configured to transmit signals via only a single antenna or a subset of the plurality of antennas at the client device. For example, a client device may be configured to send uplink transmissions to the base station 10 using a single transmitter via a single antenna, whereas the client device receives signals at each of a plurality of antennas. Consequently, in this example, the base station 10 can derive channel information with respect to only one antenna of the client device.

The channel information with respect to one antenna of the client device is limiting because it allows for accurate computation of only a single beamforming weight vector. For example, in a system in which the base station 10 is configured to transmit two signal streams simultaneously to a client device, the base station 10 needs two beamforming weight vectors, denoted $W_1$ for the first signal (data) stream and $W_2$ for the second data stream. However, as explained above, if the client device can transmit from only one antenna, the base station can accurately compute only beamforming weight vector $W_1$ whereas less accurate techniques are employed to compute the second beamforming weight vector $W_2$ is sub-optimum. For example, one technique is to estimate $W_2$ based on assumptions made about the channel with respect to a second antenna at the client device.

For some channel conditions, the sub-optimum beamforming weight vector $W_2$ results in a MIMO channel with poor conditions. The poor channel conditions are indicated when paths from the first virtual antenna of the base station are very strong, but the paths from the second virtual antenna of the base station are very weak. These channel conditions would likely result in high decoding error at the client device even when the receive signal-to-noise ratio is relatively high.

Specifically, in a wireless communication channel environment with relatively weak (less) multipath conditions, the beamforming weight vector $W_2$ calculated using the rough estimation techniques referred to above would result in a poor-conditioned MIMO channel. The paths from the first virtual antenna at the base station 10 are strong but the paths from the second virtual antenna are very weak. As a result, the symbols in the data stream that is transmitted using the second beamforming weight vector $W_2$ would be very weak at the client device. Even though the symbols in the data stream transmitted with the first beamforming weight vector $W_1$ are very strong, the decoding capability of the client device would be limited by those weak signals sent with the second beamforming weight vector $W_2$. Accordingly, it has been determined that under such channel conditions, balancing the power of the different signal streams (symbols from the respective signal streams) and adjusting the phase of the signal streams significantly improves performance.

To this end, as indicated in FIG. 1, the base station 10 is configured to derive a measure of multipath of the wireless channel between the base station 10 and a given client device based on received uplink transmissions from the client device and to adjust power balance and phase of respective downlink signal streams. These techniques can increase the performance of a MIMO-beamforming system and allow for more robust transmission of multiple signal streams as opposed to only a single data stream (or lesser number of possible data streams). Furthermore, these techniques are implemented entirely at the base station 10 and are therefore completely transparent to the client device.

Figure 2:
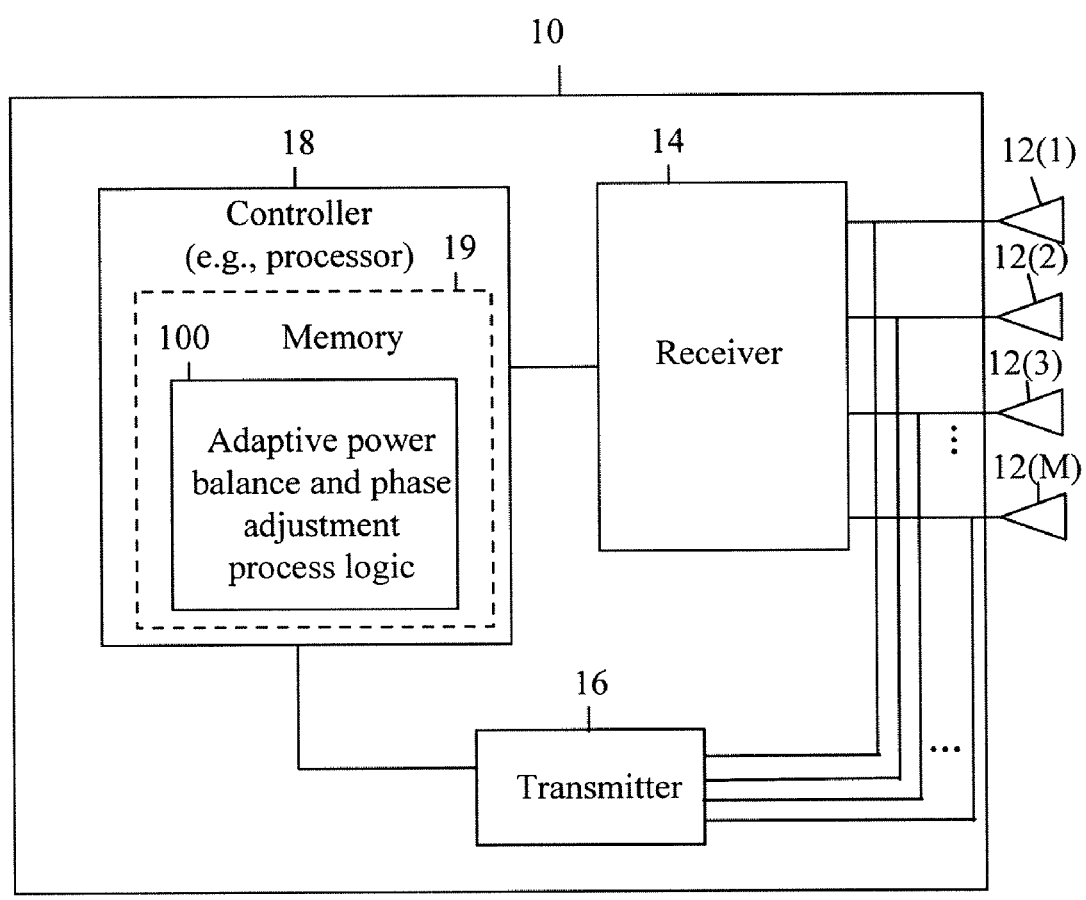
FIG. 2 is a block diagram of a first wireless communication device, e.g., a base station, configured to adaptively adjust power balance and phase with respect to multiple downlink data streams to be sent to a second wireless communication device, e.g., a wireless client device.

Reference is now made to FIG. 2 for a description of a wireless communication device, e.g., base station 10, that is configured or equipped to perform the aforementioned power balancing and phase adjustment techniques when MIMO-beamforming signal streams to a client device. The base station 10 comprises a receiver 14, a transmitter 16 and a controller 18. The controller 18 supplies data (in the form of transmit signals) to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals from each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal for downconversion processing by the receiver 14 and then processing by the controller 18 for signal detection and downlink beamforming weight vectors estimation. For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown. The controller 18 applies downlink beamforming weight vectors to the multiple downlink transmission streams (e.g., symbol streams) to produce transmit signals. The controller 18 supplies the transmit signals to the transmitter 16 and the transmitter radio frequency (RF) modulates (e.g., upconverts) the respective transmit signals for transmission via respective ones of the plurality of antennas.

The controller 18 is, for example, a signal or data processor that comprises a memory 19 or other data storage block that stores data used for the techniques described herein. The memory 19 may be separate or part of the controller 18. Instructions for adaptive power balance and phase adjustment process logic 100 are stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. In another form, the process logic 100 may be embodied in a processor readable medium that is encoded with instructions for execution by a processor (e.g., controller 18) that, when executed by the processor, are operable to cause the processor to perform the functions described herein in connection with process logic 100. As will become more apparent hereinafter, a wireless communication device or apparatus is provided that comprises a plurality of antennas, a receiver configured to be coupled to the plurality of antennas and to produce receive signals associated with received uplink transmissions received at the plurality of antennas from another wireless communication client device, and a controller configured to the coupled to the receiver. The controller is configured to determine a measure of multipath conditions with respect to the other wireless communication client device based on the received uplink transmissions, and to apply multiple downlink beamforming weight vectors together with power balance and phase adjustment factors depending on the measure of multipath conditions to transmit multiple downlink data streams across the plurality of antennas simultaneously to the other wireless communication device.

Moreover, a processor readable medium is provided that is encoded with instructions for execution by a processor, and when executed, are operable to cause the processor to determine a measure of multipath conditions between a first wireless communication device and a second wireless communication device based on uplink transmissions sent by the second wireless communication device and received at a plurality of antennas of the first wireless communication device; apply downlink beamforming weight vectors to transmit multiple downlink data streams across the plurality of antennas simultaneously to the second wireless communication device; and adjust power balance and phase of the downlink data streams depending on the measure of multipath conditions.

Figure 3:
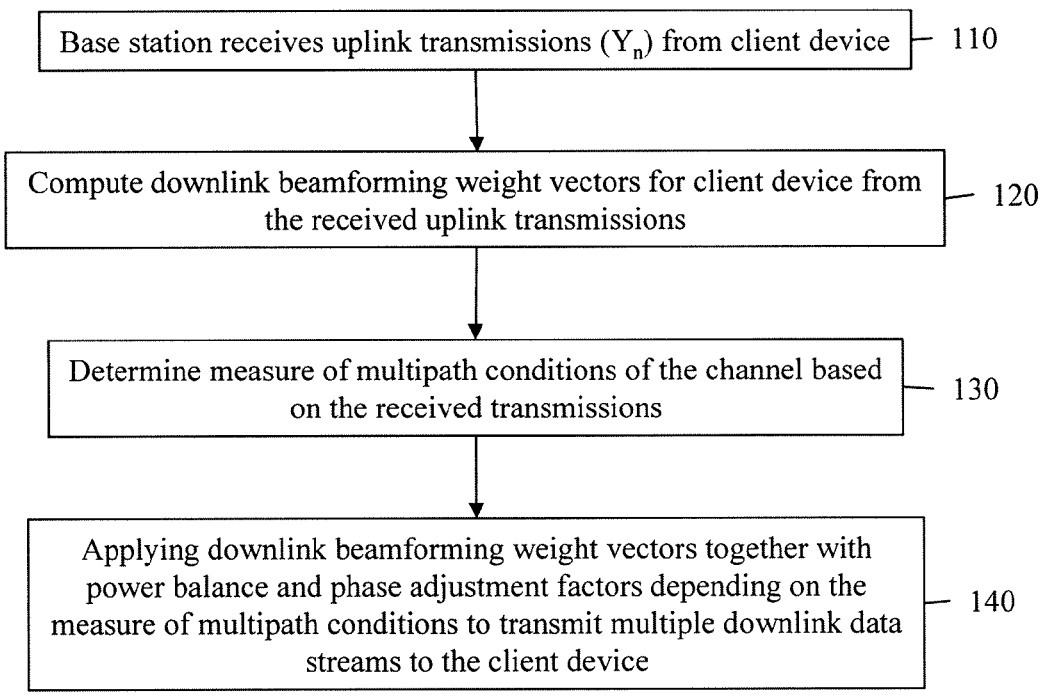
FIG. 3 is a flow chart generally depicting a process for adaptively adjusting power balance and phase with respect to multiple downlink data streams.

Reference is now made to FIG. 3 that shows a flow chart generally depicting the process logic 100. At 110, the base station 10 receives uplink transmissions from a particular wireless client device, e.g., client device 20(1) in FIG. 1. An instance of an uplink transmission is denoted $Y_n$, and the base station 10 may receive a plurality of uplink transmissions (n=1 to N). At 120, based on the received uplink transmissions, the base station 10 computes downlink beamforming weight vectors for use in beamforming multiple downlink data streams using MIMO-beamforming techniques (as described above) to the particular wireless client device. Any of a variety of now known or hereinafter developed techniques for computing beamforming weight vectors may be used at 120. At 130, the base station 10 determines a measure of multipath conditions between it and the particular wireless client device based on the received uplink transmissions from the particular wireless client device.

At 130, the base station determines a measure of the multipath conditions of the wireless channel between it and the particular wireless client device based on the received uplink transmissions from the particular wireless client device. An example of a technique to compute a measure of the multipath conditions of the wireless channel is described hereinafter in connection with FIG. 4.

At 140, the base station applies the downlink beamforming weight vectors (computed at 120) together with power balance and phase adjustment factors depending on the measure of multipath conditions to transmit multiple downlink data streams across the plurality of base station antennas simultaneously to the particular wireless client device.

Figure 4:
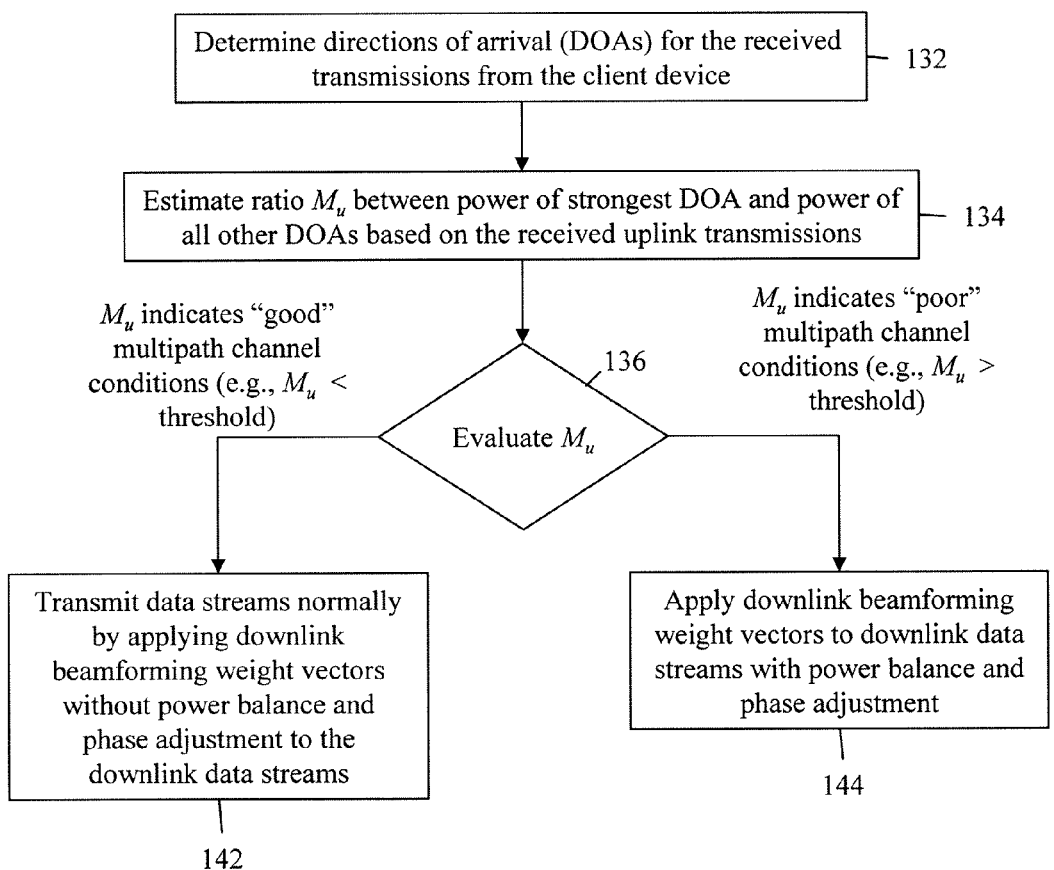
FIG. 4 is a flow chart depicting more detailed functions associated with computing a measure of multipath conditions of a wireless channel and adaptively adjusting power balance and phase to multiple downlink data streams based on the measure of multipath conditions.

Turning now to FIG. 4, an example of techniques are described to derive a measure of the multipath conditions of the channel and to apply power balance and phase adjustment factors to the downlink signal streams. At 132, using the received uplink transmissions from the particular wireless client device, the base station determines the direction of arrivals (DOAs) associated with the received uplink transmissions. Any technique now known or hereinafter developed may be used to determine the DOAs from signals received at the plurality of antennas of the base station 10 from the client device.

At 134, the base station computes an estimate of the ratio between a power associated with the strongest direction of arrival with respect to the power of all the other directions of arrival from that wireless client device. For example, one technique to compute this ratio is to compute a covariance matrix $R_{UL}$ from received uplink transmissions as $$R_{UL} = \sum_{i=1}^{N} Y_i(Y_i)^H,$$

where $^H$ denotes the Hermitian operation. Then, using singular value decomposition techniques, the singular values of the covariance matrix $R_{UL}$ is computed to obtain a plurality of eigenvectors. For example, the L eigenvectors of the covariance matrix $R_{UL}$ are $\{\tilde{U}_1, \tilde{U}_2, \ldots, \tilde{U}_L\}$ corresponding to the eigenvalues $\{\tilde{\Lambda}_1, \tilde{\Lambda}_2, \ldots, \tilde{\Lambda}_L\}$ with $\tilde{\Lambda}_1 \geq \tilde{\Lambda}_2 \geq \ldots \geq \tilde{\Lambda}_L$. Then, a ratio $M_u$ is computed from eigenvalues $\{\tilde{\Lambda}_1, \tilde{\Lambda}_2, \ldots, \tilde{\Lambda}_L\}$ as $\tilde{\Lambda}_1/\{\tilde{\Lambda}_2 + \tilde{\Lambda}_3 + \ldots + \tilde{\Lambda}_L\}$. That is, the ratio $M_u$ is a ratio of the strongest DOA $\tilde{\Lambda}_1$ with respect to a sum of all of the other DOAs. This ratio $M_u$ represents the measure of multipath conditions for the wireless channel and is also referred to herein as a multipath factor for the channel.

At 136, the measure of multipath $M_u$ is evaluated to determine whether it is indicative of "good" multipath channel conditions or "poor" multipath channel conditions. When the multipath measure $M_u$ is relatively small, this indicates that there is more than one dominant path in the wireless channel, i.e., good multipath conditions. Under good multipath conditions, the probability of a good-conditioned MIMO channel would result from the straightforward application of downlink beamforming weight vectors that are computed from channel information derived from a transmission sent via only one antenna (or a subset of antennas that would be used for receiving downlink signals from the base station) of the client device.

For example, the measure of multipath conditions $M_u$ is compared with a threshold. When $M_u$<threshold, this is interpreted as an indication of "good" multipath channel conditions (more than one dominant path in the channel) and when $M_u$>threshold, this indicates "poor" multipath channel conditions (no more than one dominant path in the channel). When the multipath channel conditions (indicated by the comparison of $M_u$ with the threshold) are "good" as determined at 136, then at 142 the downlink beamforming weight vectors are applied to corresponding downlink data streams without power balance and phase adjustment. For example, in the case where two downlink data streams are to be transmitted, comprising a first stream containing odd symbols and a second stream containing even symbols, a first downlink beamforming weight vector $W_1$ is applied to the first stream and a second downlink beamforming weight vector $W_2$ is applied to the second stream. An example of a value for the threshold $M_u$ is 4.

Figure 5:
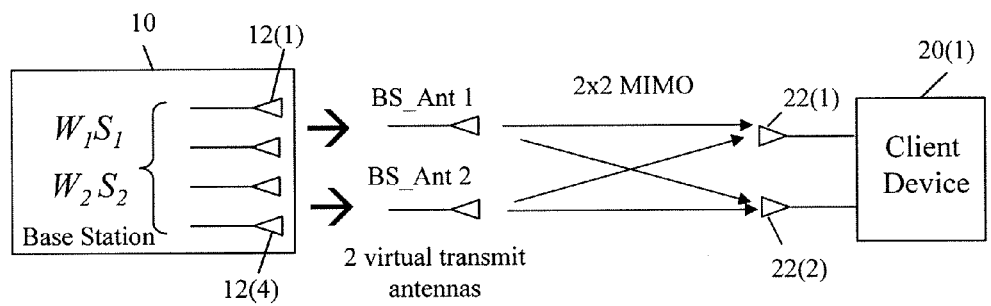
FIG. 5 is a diagram illustrating an example of a scenario where power balance and phase adjustment is not applied to multiple downlink data streams sent from the base station to a wireless client device.

FIG. 5 illustrates an example in which no power balancing and phase adjustment is made and the first and second beamforming weight vectors $W_1$ and $W_2$ are M-dimensional vectors (where M=4 corresponding to the number of antennas of the base station 10 in this example). The client device, e.g., client device 20(1), has two antennas 22(1) and 22(2) in this example. Furthermore, in this example, a main transmission stream (signal stream) whose transmission throughput is to be increased is divided into a first data stream $S_1$ comprising odd number symbols of the main stream and a second data stream $S_2$ comprising even number symbols of the main stream. Rather than sending these symbols serially, odd-even-odd-even, they are sent simultaneously in two separate streams (odd-odd-odd and even-even-even). The first beamforming weight vector $W_1$ is applied to the first data stream $S_1$, i.e., $W_1 S_1$, and the second beamforming weight vector $W_2$ is applied to the second data stream $S_2$, i.e., $W_2 S_2$. No power balancing or phase adjustment is applied in the example of FIG. 5 as this is meant to illustrate the situation where the measure of multipath $M_u$ is less than a threshold. After application of the beamforming weight vectors to the signal streams, the beamformed transmissions from the base station 10 may be modeled as a first "virtual" antenna (BS_Ant1) that transmits the first data stream $S_1$ and a second virtual antenna (BS_Ant2) that transmits the second data stream $S_2$ over a 2×2 MIMO channel to two antennas 22(1) and 22(2) at client device 20(1).

Reference is made back to FIG. 4. When the multipath channel conditions are poor (as indicated by the comparison of $M_u$ with the threshold), then at 144, the downlink beamforming weight vectors are applied to the downlink transmission streams with power balance and phase adjustment. Generally, at 144, the downlink beamforming weight vectors are applied to a combination of multiple downlink transmission streams that are individually weighted by a corresponding power balance factor and phase adjustment factor.

An example of a poor-conditioned MIMO channel is represented by the channel matrix for a 2×2 channel (such as that shown in FIG. 5):

$$H = \begin{bmatrix} 1.0962 + 2.0345j & 0.0857 + 0.1837j \\ -0.3603 - 2.8912j & 0.0185 + 0.044j \end{bmatrix},$$

where the first column represents the path associated with the first virtual antenna of the base station (BS_Ant1) and the second column represents the path associated with second virtual antenna of the base station (BS_Ant2). In this example, the power of the path associated with the first virtual antenna is 25 dB higher than that of the second virtual antenna. Therefore, the signal strength of odd number symbols (sent via the first virtual antenna of the base station) is sufficient to support a relatively high modulation coding scheme (e.g., Q64 with 5/6 error coding depth), but the signal strength of even number symbols is too weak to support even a lowest modulation coding scheme. As a result, the ability of the client device to decode the overall (main) stream (comprising symbols from the first data stream and symbols from the second data stream) is limited by the poor reception of the even number symbols of the second data stream. Thus, with these types of channel conditions, power balance and phase adjustment will provide substantial improvement.

Figure 6:
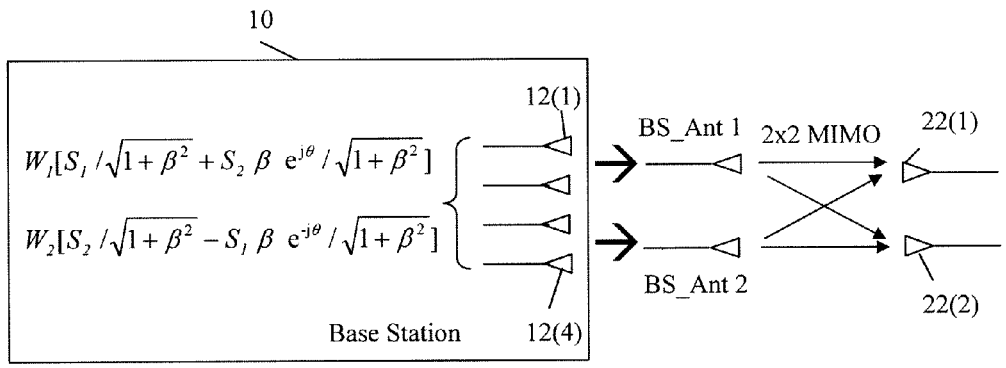
FIG. 6 is a diagram illustrating an example of a scenario where power balance and phase adjustment is applied to multiple downlink data streams sent from the base station to a wireless client device.

FIG. 6 illustrates an example where power balance and phase adjustment is used when applying the downlink beamforming weight for the case where there are two downlink signal streams $S_1$ and $S_2$, similar to that referred to above in connection with FIG. 5. A first power balance factor is defined as $1/\sqrt{1+\beta^2}$ and a second power balance factor is defined as $\beta/\sqrt{1+\beta^2}$, where $\beta$ is a positive value between 0 and 1. In addition, a first phase adjustment factor is defined as $e^{j\theta}$ and a second phase adjustment factor is defined as $e^{-j\theta}$, where $\theta$ is between 0 and 180 degrees. Values for $\beta$ and $\theta$ may be selected as fixed values, or they may be computed dynamically depending on the measure of multipath $M_u$. For example, a larger value for $\beta$ is used for a larger measure of multipath $M_u$, and for smaller measures of multipath $M_u$, a smaller value of $\beta$ is used.

In one example, the power balance and phase adjustment factors are applied as follows. A first downlink beamforming weight vector $W_1$ is applied to a first combined stream resulting from the first data stream (comprising odd number symbols) multiplied with the first power balance factor, $1/\sqrt{1+\beta^2}$ added with the second data stream (comprising even number symbols) multiplied with the second power balance factor $\beta/\sqrt{1+\beta^2}$ and the first phase adjustment factor $e^{j\theta}$. That is, the first downlink beamforming weight vector $W_1$ is applied to $S_1/\sqrt{1+\beta^2} + S_2 \beta e^{j\theta}/\sqrt{1+\beta^2}$. The second downlink beamforming weight vector $W_2$ is applied to a second combined stream resulting from the first stream (comprising the odd number symbols) multiplied with the second power balance factor $\beta/\sqrt{1+\beta^2}$ and the second phase adjustment factor $e^{-j\theta}$ (which is the negative or opposite of the first phase adjustment factor) subtracted from the second stream comprising the even number symbols multiplied by the first power balance factor $1/\sqrt{1+\beta^2}$. That is, the first downlink beamforming weight vector $W_2$ is applied to $S_2/\sqrt{1+\beta^2} - S_1 \beta e^{-j\theta}/\sqrt{1+\beta^2}$.

Figure 7:
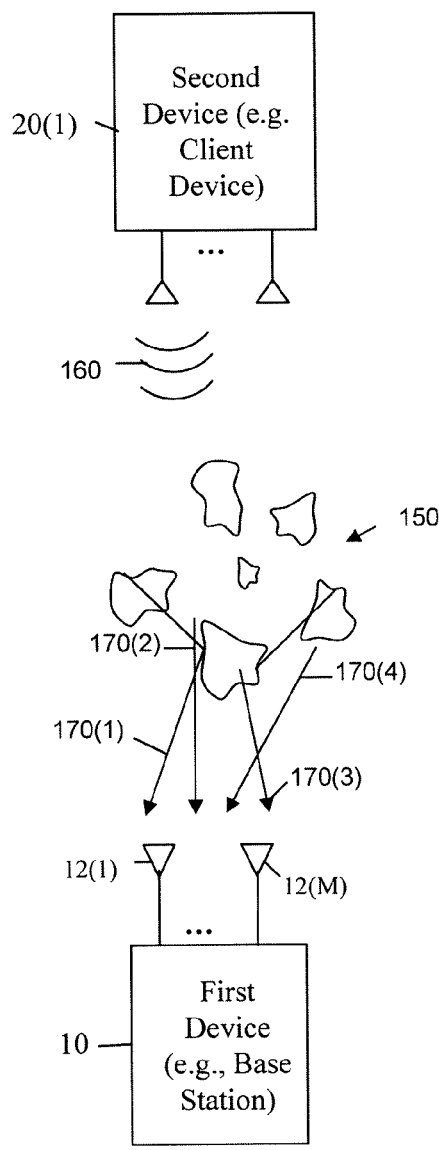
FIG. 7 is a diagram illustrating an example of channel conditions where power balance and phase adjustment would not be applied because there are substantial multipath conditions between the wireless client device and base station.
Figure 8:
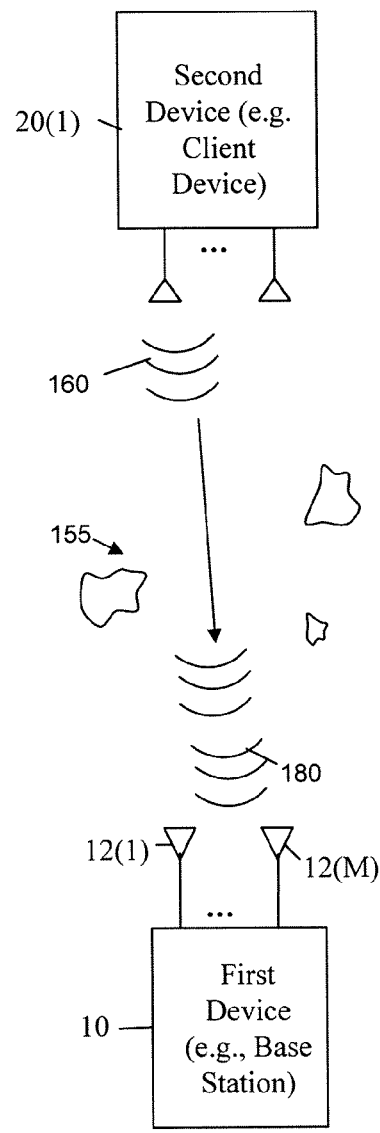
FIG. 8 is a diagram illustrating an example of channel conditions where power balance and phase adjustment would be applied because there are minimal multipath conditions between the wireless client device and base station.

Turning now to FIGS. 7 and 8, examples of situations are shown when power balancing and phase adjustment is applied and when it is not applied. FIG. 7 illustrates a situation where a given client device, e.g., client device 20(1) is in communication with the base station 10 in which a collection of obstacles or other channel conditions are between the two devices as shown at reference numeral 150. When the client device 20(1) sends an uplink transmission 160 from one (or subset) of its antennas, due to the obstacles 150, the base station 10 receives a plurality of paths 170(1), 170(2), 170(3) and 170(4). Thus, in the example of FIG. 7, the base station would likely generate a relatively small value for $M_u$ because there is more than one dominant path that reaches the base station 10 at its multiple antennas 12(1)-12(M). Consequently, the base station 10 would not apply power balance and phase adjustment in the scenario of FIG. 7.

Conversely, FIG. 8 shows a situation where there is a minimal collection of obstacles or other channel conditions indicated at reference numeral 155. In this case, when the client sends an uplink transmission 160 from one (or subset) of its antennas, there is a single dominant path 180 that reaches the base station 10 at its multiple antennas 12(1)-12(M) due to the minimal multipath nature of the obstacles or channel condition depicted at 155. In this case, the base station 10 would compute a relatively large value for $M_u$ because there is only a single dominant path to the base station 10. The base station 10 would therefore apply power balance and phase adjustment in the scenario depicted in FIG. 8.

In sum, the techniques described herein use a measure of the multipath conditions of a wireless channel (derived from received uplink transmissions) to adaptively apply power balance and phase adjustment to downlink MIMO-beamformed transmissions. When the measure of multipath conditions indicates that the channel is a poor-condition MIMO channel, the power balance and phase adjustment is applied so that all symbols (from multiple streams) pass over the channel with relatively good quality. As a result, a client device receives the MIMO transmissions with sufficient signal quality to maintain decoding performance on the received symbols. The client device need not be modified in any way to support these techniques because these techniques are completely implemented at the base station and are transparent to the client device. The base station can change how and when it applies power balance and phase adjustment according to changes in the multipath measure without any change in requirements or functionality at the receiver.

The above description is intended by way of example only. Various modifications and structural changes may be made therein without departing from the scope of the concepts described herein and within the scope and range of equivalents of the claims.

What is claimed is:

1. A method comprising:
at a first wireless communication device having a plurality of antennas, receiving uplink transmissions from a second wireless communication device;
determining a measure of multipath conditions between the first wireless communication device and the second wireless communication device based on the received uplink transmissions; and
applying multiple downlink beamforming weight vectors together with power balance and phase adjustment factors depending on the measure of multipath conditions to transmit multiple downlink data streams across the plurality of antennas simultaneously to the second wireless communication device.

2. The method of claim 1, and further comprising comparing the measure of multipath conditions with a threshold, wherein said applying is based on the comparison of the measure of multipath conditions with the threshold.

3. The method of claim 1, wherein when the measure of multipath conditions is less than the threshold, applying comprises applying downlink beamforming weights vectors to corresponding downlink data streams without power balance and phase adjustment.

4. The method of claim 3, wherein when the measure of multipath conditions is greater than the threshold, applying comprising computing a combination of the multiple downlink data streams that are individually weighted by a corresponding power balance factor and phase adjustment factor, and applying a downlink beamforming weight vector to the combination.

5. The method of claim 4, and further comprising computing power balance and phase adjustment factors based on the measure of multipath conditions.

6. The method of claim 1, wherein the multiple downlink data streams comprise a first stream of odd number symbols and a second stream of even number symbols, which odd number symbols and even number symbols make up a main stream, and when the measure of multipath conditions is less than the threshold, applying comprises applying a first beamforming weight vector to the first stream and applying a second beamforming weight vector to the second stream.

7. The method of claim 6, wherein when the measure of multipath conditions is greater than the threshold, applying comprises computing a first combined stream resulting from the odd number symbols in the first stream multiplied with a first power balance factor added with the even number symbols in the second stream multiplied with a second power balance factor and a first phase adjustment factor, computing a second combined stream resulting from the odd number symbols in the first stream multiplied with the second power balance factor and a second phase adjustment factor subtracted from the even number symbols of the second stream multiplied by the first power balance factor, and applying a first downlink beamforming weight vector to the first combined stream and applying a second downlink beamforming weight vector to the second combined stream.

8. The method of claim 7, and further comprising computing the first power balance factor as $1/\sqrt{1+\beta^2}$ and the second power balance factor as $\beta/\sqrt{1+\beta^2}$, where $\beta$ is a positive value between 0 and 1, and computing the first phase adjustment factor as $e^{j\theta}$ and the second phase adjustment factor as $e^{-j\theta}$, where $\theta$ is between 0 and 180 degrees.

9. The method of claim 8, wherein computing comprises computing the first power balance factor and second power balance factor using a value for $\beta$ that depends on the measure of multipath conditions.

10. The method of claim 1, wherein determining the measure of multipath conditions comprises determining directions of arrival with respect to the received uplink transmissions from the second wireless communication device, and estimating a ratio between power of a strongest direction of arrival and power of all other directions of arrival, wherein the measure of multipath conditions is the ratio.

11. The method of claim 1, wherein applying comprises applying power balance and phase adjustment to the downlink data streams when the measure of multipath conditions indicates that there is not more than one dominant path and not applying power balance and phase adjustment when the measure of multipath conditions indicates that there is more than one dominant path.

12. An apparatus comprising:
a plurality of antennas;
a receiver configured to be coupled to the plurality of antennas and to produce receive signals associated with received uplink transmissions received at the plurality of antennas from a wireless communication client device;
a controller configured to be coupled to the receiver, wherein the controller is configured to:
determine a measure of multipath conditions with respect to the wireless communication client device based on the received uplink transmissions; and
apply multiple downlink beamforming weight vectors together with power balance and phase adjustment factors depending on the measure of multipath conditions to transmit multiple downlink data streams across the plurality of antennas simultaneously to the wireless communication device.

13. The apparatus of claim 12, and further comprising a transmitter configured to be coupled to the plurality of antennas and to the controller, and wherein the controller supplies transmit signals resulting from application of the beamforming weight vectors to the downlink data streams, and wherein the transmitter modulates the transmit signals for transmission via respective ones of the plurality of antennas.

14. The apparatus of claim 13, wherein the controller is configured to evaluate the measure of multipath conditions to determine whether there is more than one dominant path in a wireless channel with respect to the wireless communication device.

15. The apparatus of claim 14, wherein the controller is configured to apply power balance and phase adjustment to the downlink data streams when the measure of multipath conditions indicates that there is not more than one dominant path and when the measure of multipath conditions indicates that there is more than one dominant path the controller is configured does not apply power balance and phase adjustment to the downlink data streams.

16. The apparatus of claim 15, wherein the controller is configured to apply at least one power balance factor and at least one phase adjustment factor to at least one of the downlink data streams, and wherein the controller is configured to compute the power balance factor based on the measure of multipath conditions.

17. The apparatus of claim 13, wherein the controller is configured to determine the measure of multipath conditions by determining directions of arrival with respect to the uplink transmissions received from the wireless communication device, and to estimate a ratio between power of a strongest direction of arrival with respect to power of all of directions of arrival, and wherein the measure of multipath conditions is the ratio.

18. A non-transitory processor readable medium encoded with instructions for execution by a processor, and when executed, are operable to cause the processor to:
   determine a measure of multipath conditions between a first wireless communication device and a second wireless communication device based on uplink transmissions sent by the second wireless communication device and received at a plurality of antennas of the first wireless communication device;
   apply multiple downlink beamforming weight vectors to transmit multiple downlink data streams across the plurality of antennas simultaneously to the second wireless communication device; and
   adjust power balance and phase of the downlink data streams depending on the measure of multipath conditions.

19. The non-transitory processor readable medium of claim 18, and further comprising instructions that, when executed by the processor, cause the processor to evaluate the measure of multipath conditions to determine whether a wireless channel between the first wireless communication device and the second wireless communication device exhibits multipath conditions having more than one dominant path.

20. The non-transitory processor readable medium of claim 19, wherein the instructions that cause the processor to evaluate comprise instructions that cause the processor to compare the measure of multipath conditions with a threshold, and wherein the instructions that cause the processor to apply the downlink beamforming weight vectors are based on a comparison of the measure of multipath conditions with the threshold.

21. The non-transitory processor readable medium of claim 20, wherein the instructions that cause the processor to apply comprise instructions that cause the processor to apply downlink beamforming weights vectors to corresponding downlink data streams without power balance and phase adjustment when the instructions that cause the compare determines that the measure of multipath conditions is less than the threshold.

22. The non-transitory processor readable medium of claim 21, wherein the instructions that cause the processor to apply comprise instructions that cause the processor to compute a combination of the multiple downlink data streams that are individually weighted by a corresponding power balance factor and phase adjustment factor when the measure of multipath conditions is greater than the threshold, and to apply a downlink beamforming weight vector to the combination.

* * * * *